(12) United States Patent
Wolleschensky et al.

(10) Patent No.: US 7,733,564 B2
(45) Date of Patent: Jun. 8, 2010

(54) APPLICATIONS OF ADAPTIVE OPTICS IN MICROSCOPY

(75) Inventors: Ralf Wolleschensky, Schoeten (DE); Robert Grub, Heubach (DE); Ulrich Simon, Jena (DE); Martin Gluch, Jena (DE); Andreas Faulstich, Aalen (DE); Martin Voelcker, Koenigsbronn-Zang (DE)

(73) Assignee: Carl Zeiss MicroImaging, Jena (DE)

( * ) Notice: Subject to any disclaimer, the term of this patent is extended or adjusted under 35 U.S.C. 154(b) by 0 days.

(21) Appl. No.: 10/162,091

(22) Filed: Jun. 3, 2002

(65) Prior Publication Data

US 2002/0154398 A1    Oct. 24, 2002

Related U.S. Application Data

(60) Continuation of application No. 09/686,057, filed on Oct. 11, 2000, now abandoned, which is a division of application No. 09/129,339, filed on Aug. 5, 1998, now Pat. No. 6,771,417.

(60) Provisional application No. 60/055,319, filed on Aug. 11, 1997.

(30) Foreign Application Priority Data

Aug. 1, 1997    (DE) .................................. 197 33 193

(51) Int. Cl.
*G02B 21/06* (2006.01)

(52) U.S. Cl. .................................... 359/385; 359/368

(58) Field of Classification Search ................. 359/368, 359/385, 389, 846, 849, 382–383, 399; 250/201.9
See application file for complete search history.

(56) References Cited

U.S. PATENT DOCUMENTS

| | | | | |
|---|---|---|---|---|
| 4,579,430 A | * | 4/1986 | Bille | .......................... 351/206 |
| 4,727,234 A | * | 2/1988 | Oprysko et al. | .......... 219/121.6 |
| 4,773,719 A | * | 9/1988 | Anderson et al. | .............. 359/7 |
| 5,034,613 A | * | 7/1991 | Denk et al. | .............. 250/458.1 |
| 5,067,811 A | * | 11/1991 | Ouchi | ........................ 356/121 |
| 5,107,124 A | * | 4/1992 | Winkler | .................. 250/396 R |
| 5,119,385 A | * | 6/1992 | Aoshima et al. | .............. 372/23 |
| 5,684,545 A | * | 11/1997 | Dou et al. | ........................ 349/1 |
| 5,785,704 A | * | 7/1998 | Bille et al. | ...................... 606/17 |
| 5,796,112 A | * | 8/1998 | Ichie | ........................ 250/458.1 |
| 5,978,053 A | * | 11/1999 | Giles et al. | ...................... 349/17 |
| 6,178,041 B1 | * | 1/2001 | Simon | ........................ 359/368 |
| 6,381,074 B2 | | 4/2002 | Yoshida | ...................... 359/661 |
| 6,384,952 B1 | * | 5/2002 | Clark et al. | .................. 359/224 |

OTHER PUBLICATIONS

Webb, Watt W., Multi-photon Laser Microscopy, PCT/US96/14519 (WO 97/11355), published Mar. 27, 1997.*
Denlinger, J.D. et al., First Results from the SpectroMicroscopy Beamline at the Advanced Light Source. in: Review of Scientific Instruments (USA), vol. 66, No. 2, pt.2, p. 1342-5, Feb. 1995. Q184. R5.*
U.S. Appl. No. 60/041,725.*
"Adaptive Optics Engineering Handbook", Chaper 1, Introduction, Robert K. Tyson, pp. 1-27; Chaper 2, System Design and Optimization, Ronald R. Parenti, pp. 29-58; and Chapter 4, Wavefront Sensors, Joseph M. Geary, pp. 123-150.

* cited by examiner

*Primary Examiner*—Lee Fineman
(74) *Attorney, Agent, or Firm*—Frommer Lawrence & Haug LLP

(57) ABSTRACT

The use of one or more wavefront modulators in the observation beam path and/or illumination beam path of a microscope provide various advantageous results. Such modulators may be adapted to change the phase and/or the amplitude of light in such a way to carry out displacement and shaping of the focus in the object space and correction of possible aberrations. The possible areas of use include confocal microscopy, laser-assisted microscopy, conventional light microscopy and analytic microscopy.

12 Claims, 10 Drawing Sheets

Actuator structures
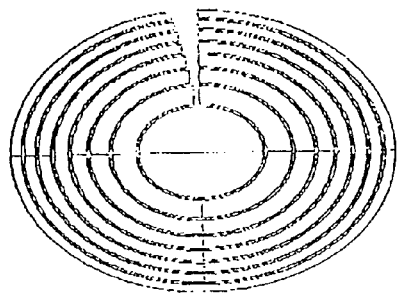
dr prop. 1/r  Fig. 4A
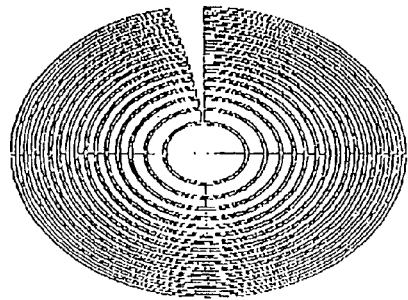
dr prop. 1/r  Fig. 4B
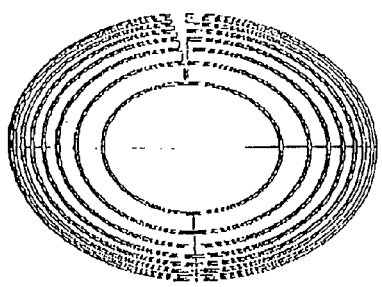
dr prop. $1/r^{}2$  Fig. 4C**
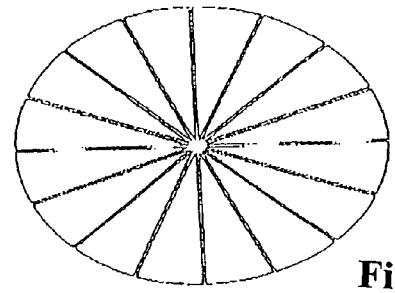
Fig. 4D
astigmatism, coma or other angular corrections
Fig. 4

Phase modulators
in different constructions
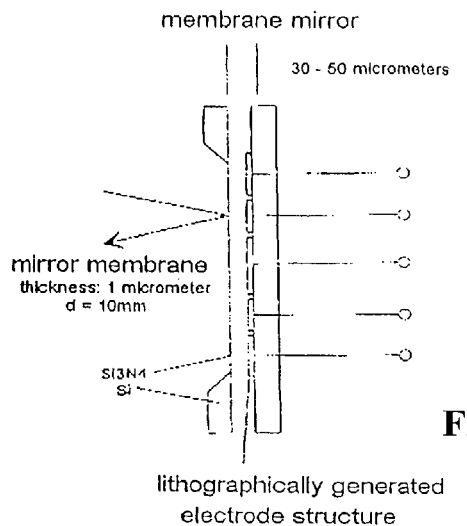
Fig. 5A
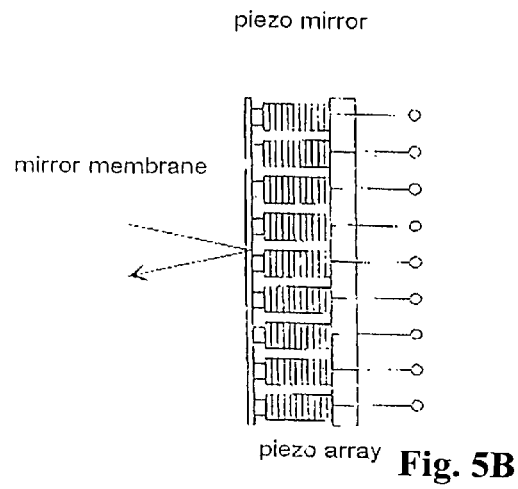
Fig. 5B
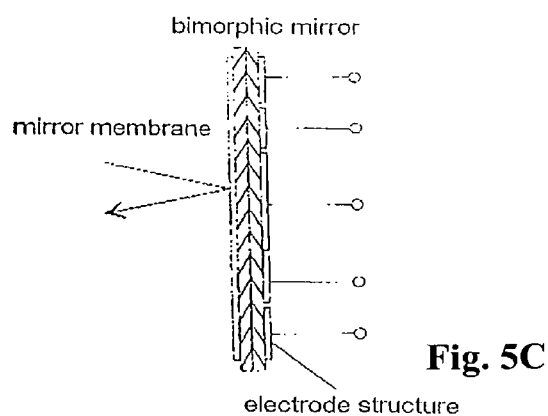
Fig. 5C
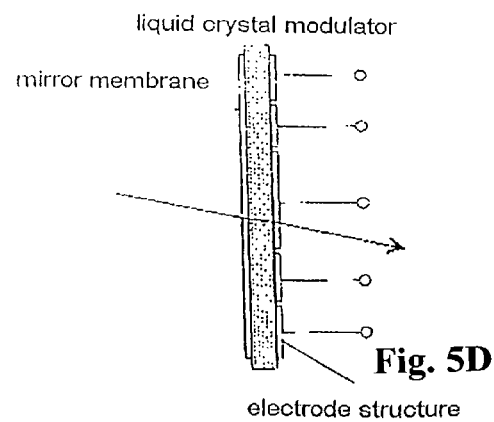
Fig. 5D
Fig. 5

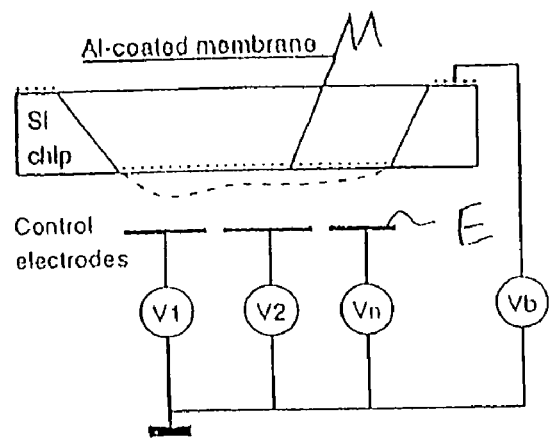
Fig. 6A
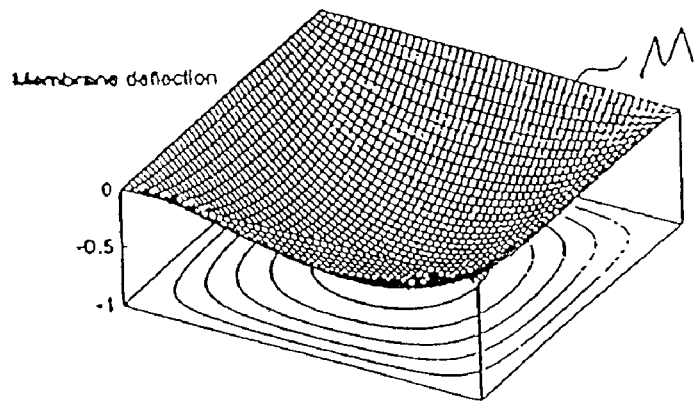
Fig. 6B
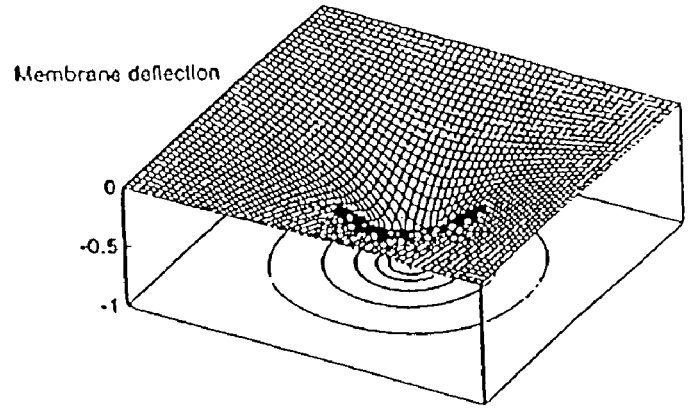

APPLICATIONS OF ADAPTIVE OPTICS IN MICROSCOPY

RELATED APPLICATION

This is a continuation of an application, Ser. No. 09/686,057, filed Oct. 11, 2000 now abandoned, which is a division of application Ser. No. 09/129,339 filed on Aug. 5, 1998 now U.S. Pat. No. 6,771,417, which is based on U.S. Provisional Application 60/055,319 filed Aug. 11, 1997, which claims priority of German Application No. 197 33 193.9, filed on Aug. 1, 1997.

BACKGROUND OF THE INVENTION

The present invention relates to the expansion of current microscopes by one or more wavefront modulators in the observation beam path and/or illumination beam path of a microscope. The modulator(s) purposely change(s) the phase and/or the amplitude of the light in such a way that a displacement and shaping of the focus in the object space and a correction of possible aberrations is achieved. The possible areas of use include confocal microscopy, laser-assisted microscopy, conventional light microscopy and analytic microscopy.

The following are patents related to the present invention:

U.S. Pat. No. 4,408,874, W. Zinky, L. Rosenberg (1981/83): Mechanically or pneumatically deformable optical element for astigmatic magnification adjustment for imaging systems in lithography.

EPO 0098969 B1, J Arnaud (1983/87):
Deformable optical element for astigmatic correction. The thickness of the mirror membrane varies over the surface so that the membrane adopts a previously calculated shape when subjected to external bending forces.

EPO 0307354 B 1, H. Choffat (1988/92):
Ring arrangement of bimorphic piezo layers for axial precision adjustment of components, e.g., microscope objectives.

U.S. Pat. No. 5,142,132, B. MacDonald, R. Hunter, A. Smith (1990/92):
Adaptively controlled optical system for wafer fabrication (stepper). The adaptive element controls the focus and corrects aberrations. The error signal for correction is obtained from the light reflected back from the wafer through interference with the original light. An exact method for correction of aberrations is not indicated.

DP DE 3404063 C2, A. Suzuki, M. Kohno (1984/93):
Curved transparent membrane in the beam path of an imaging system for correction of imaging errors, especially lateral focus offset.

U.S. Pat. No. 5,504,575, R. Stafford (1993/96):
Spectrometer based on spatial light modulator and dispersing element. Uses fibers and optical switches/flexible mirrors to switch the light to the detector after passing through the dispersing element.

EPO 167877, Bille, Heidelberg Instruments (applied for 1985):
Ophthalmoscope with adaptive mirror.

Definition of Terminology:

Definition of "Wavefront Modulator":
Within the meaning of the invention, a device for deliberately influencing the phase and/or the amplitude of a light wave. Based on a reflecting optical element (deformable mirror, electrostatic control, or controlled by a piezo array, or as a bimorphic mirror) or a transmitting optical element (LCD or similar unit). It can be built in a continuous or segmented manner. In particular, the segments can be adapted for controlling the respective problem.

Definition of aberrations in the microscope:
The aberrations of the microscope objective occurring in defocussed operating mode can basically be categorized as correctable or not correctable. Causally, the aberrations can be divided into aberrations caused by the objective, aberrations caused by the additional imaging optics of the microscope, and, finally, those caused by the preparation itself.

Controlling the wavefront modulator:
Controlling the wavefront modulator by a computer with appropriate software. The required correcting variables are either calculated beforehand (offline) or are calculated from measured quantities (online, e.g., through a wavefront sensor or by measuring the point brightness in the intermediate image).

0.Introduction

In conventional light microscopy, as well as in laser-assisted microscopy, the focus of the objective must be displaced with high precision along the optical axis as well as laterally. In conventional microscopes, this is carried out by mechanical displacement of the object stage or objective. In addition, in case of illumination by laser radiation, displacements are also necessary in the object space. Consequently, there is a need for three-dimensional focus control in the object space.

Based on the principle of the microscope, these displacements can also be carried out at the wavefront of the beam path. However, this manipulation must take place in a pupil plane of the beam path. Axial displacement of the focus in the object corresponds to a spherical change in the wavefront, lateral displacement of a tilt of the wavefront. Also, aberrations in the beam path can be compensated by changing the wavefront.

OBJECT AND SUMMARY OF THE INVENTION

It is an object of the present invention to displace and shape the focus in the object space in an improved manner over that of previous devices. If is a further object of the present invention to correct aberrations in an improved manner.

In accordance with the invention, the above objects are carried out by placing one or more wavefront modulators in the observation beam path and/or illumination beam path of a microscope.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 4A-4D show segmented actuators;

FIGS. 5A-5D show different constructions of wavefront modulators;

FIGS. 6A and 6B schematically illustrate a micro-fabricated monolithic membrane mirror;

DETAILED DESCRIPTION OF CERTAIN PREFERRED EMBODIMENTS

Applications in Conventional Light Microscopy

Figure 1A:
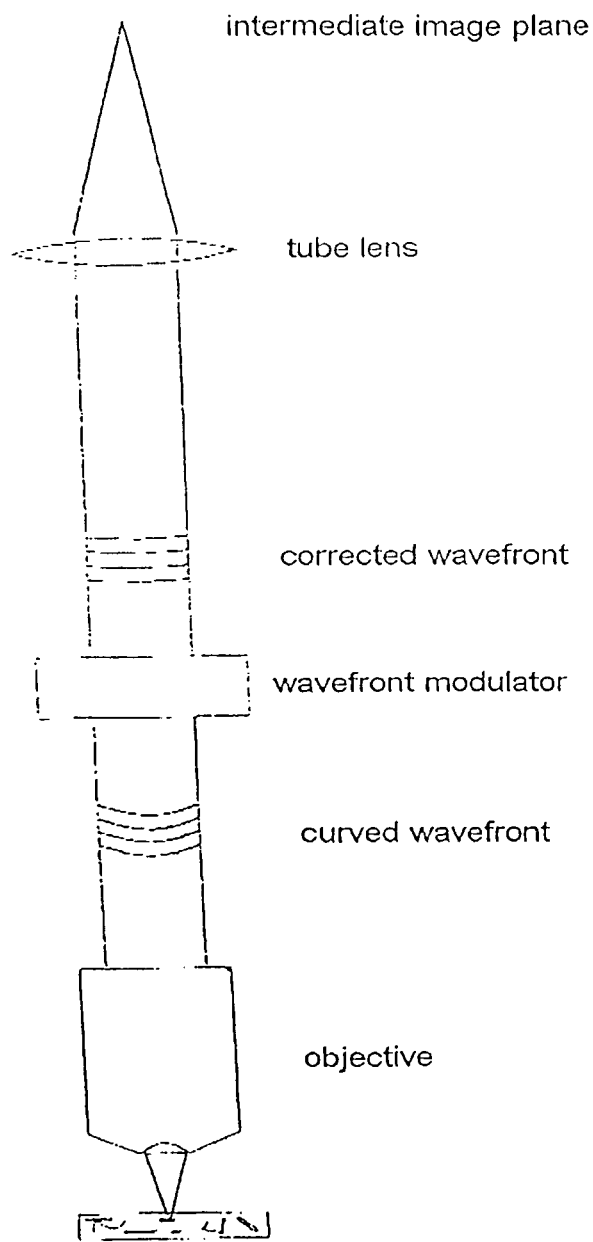
FIGS. 1A and 1B show a schematic imaging beam path of an optical light microscope with an observed object, an objective, and a tube lens for generating an intermediate image which can be viewed by eyepieces.
Figure 1B:
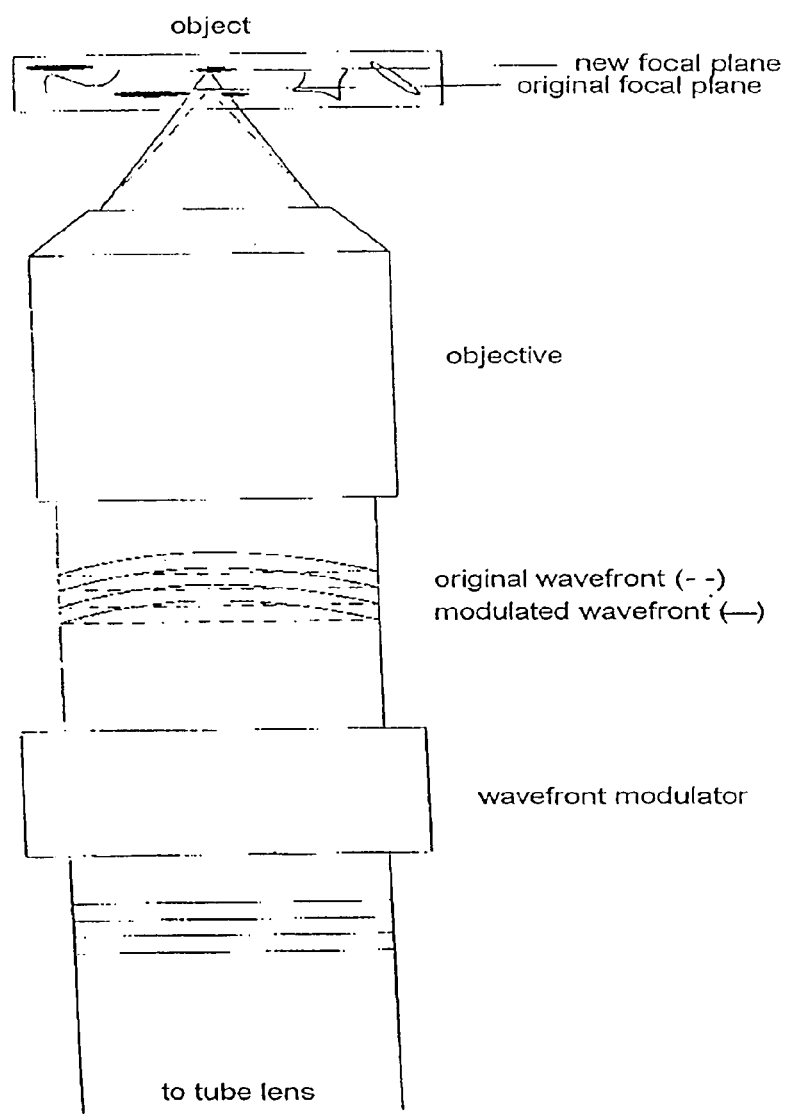

Observation Beam Path:

In order to achieve an axial displacement of the focus in the object space without changing the distance from the objective to the object, the wavefront in the pupil of the objective, or in a plane equivalent to the pupil plane, must be spherically deformed. Such deformation can be achieved through a wavefront-phase modulator. FIGS. 1A and 1B show a schematic imaging beam path of an optical light microscope with an observed object, an objective, and a tube lens for generating an intermediate image which can be viewed by eyepieces, not shown. A wavefront modulator, according to the invention, is arranged between the tube lens and objective. The wavefront which is curved after the objective is corrected by the wavefront modulator by compensating for the aberrations of the objective.

Calculations have shown that with radii of curvature of the wavefront in the pupil of between −3.0 m and 1.5 m, the focus can be displaced by more than 1.5 mm. This depends on the objective that is used; in the present case, the data refer to the Epiplan-Neofluar 20×/0.5. Displacements in the range of several tens of micrometers are sufficient in most cases. As mathematical calculations have further shown, the interval of a possible focus displacement decreases as the magnification of the objective increases. However, since the objective is not calculated or designed for this spherically deformed wavefront in the entrance pupil, aberrations through the objective during defocussing cannot be prevented.

A focus displacement of the kind mentioned above without mechanical influence of the objective has several advantages. First, any mechanical influencing of the object by the microscope objective is eliminated by the fixed working distance between the front lens of the objective and the object. Accordingly, it is possible for the first time to carry out sectionwise image recording with different depth positions of the observation plane with a static water-immersed object. Previously, a technique of this kind failed as a result of the mechanical deformation of the object and its surrounding medium through mechanical pressure on the preparation.

The fixed working distance in the microscope also yields advantages in the analytic examination of specimens in the biomedical field. When using microtiter plates, a correction of aberrations caused by the microtiter plate can be compensated. The microtiter plate can be included optically in the beam path and the microscope objective can be partially (e.g., the front lens) integrated therein.

Figure 1C:
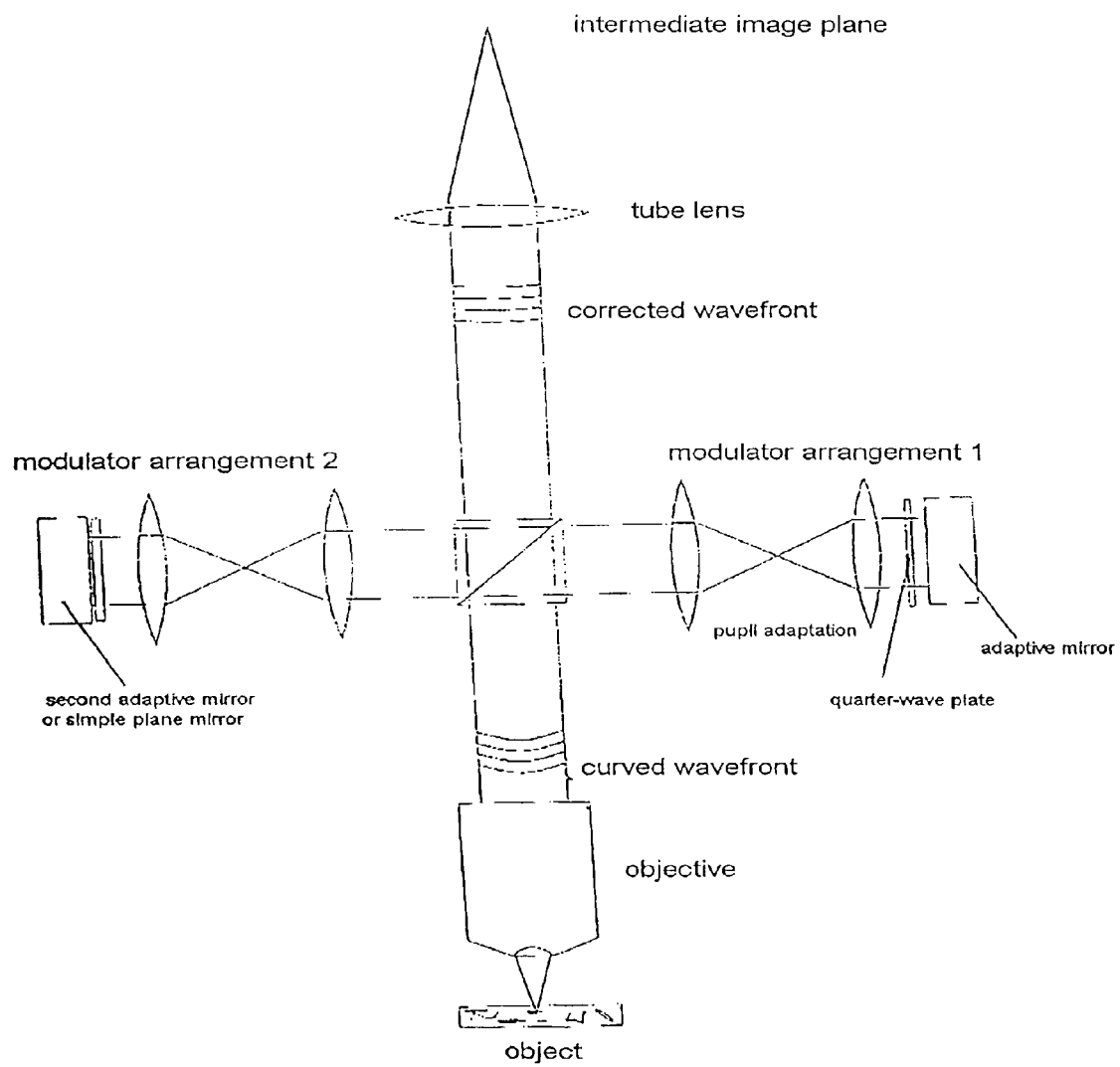
FIG. 1C shows a construction of an optical light microscope with deformable mirrors which correct the wavefront in the direction of the tube.
Figure 2:
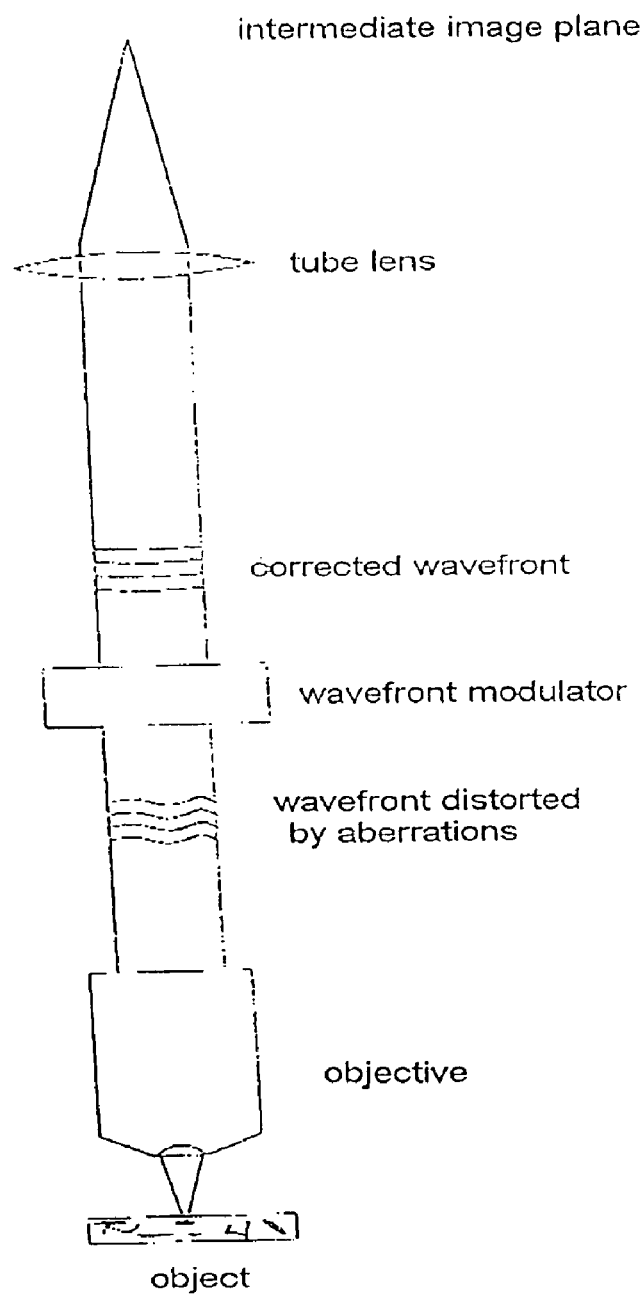
FIG. 2 shows an imaging beam path with correction of aberrations by deformation of the wavefront through the wavefront modulator.

FIG. 1C shows a construction of an optical light microscope with deformable mirrors which correct the wavefront in the direction of the tube lens. A first modulator arrangement and a second modulator arrangement are included in the imaging via a beam splitter between the objective and tube lens. In addition, optics for pupil adaptation are provided in front of each modulator arrangement. The above-mentioned arrangements will be described more fully in connection with FIG. 7. A correction of aberrations due to the preparation and the surrounding medium of the specimen is also possible by means of a suitable deformation of the wavefront through the wavefront modulator. This is shown in FIG. 2. The wavefront which is distorted by aberrations is corrected by the wavefront modulator arranged between the objective and the tube lens. However, the spherical components in the wavefront correction are not sufficient for this purpose; aspherical components must be included. Annular actuators are sufficient for rotationally symmetric aberrations (all terms of higher-order spherical aberration). For angle-dependent aberrations, segmented actuators must be used (FIGS. 4A-4D). These segmented actuators can either be integrated together in the same wavefront modulator or two independent modulators can be used in different pupil planes. In the first case, the number of actuators is in a quadratic scale, in the latter case a linear scale, with the required resolution, which means a reduction in the complexity of control electronics.

Currently obtainable phase modulators are limited with respect to amplitude and with respect to the maximum phase gradients that can be generated. This in turn limits the possibilities for correction far away from the working point of the objective. A conceivable alternative consists in combining adaptive optics with conventional glass optics. The latter serve to generate a large phase gradient or large wavefront amplitudes, and precision tuning is achieved by means of adaptive optics.

When displacing to a greater focus distance, the required convex wavefront of the pupil results in a vignetting which leads to lower light efficiency and a reduction in usable aperture. This limitation is design-related and can be taken into account, in principle, in future optical configuration of an objective.

Further, aberrations occurring in the beam path when the focus is displaced can result in distortions of the image. In order to correct these aberrations, non-spherical components can be superposed on the wavefront as was indicated above. According to mathematical calculations, a considerable improvement can be achieved in the image (beam ratio greater than 98%) even with small rotationally symmetric components of orders $r^4$ and $r^6$ (spherical aberration of higher order) at the wavefront.

A further advantage of the process consists in the achromatic behavior of a reflection-based wavefront modulator. With a suitable coating of the membrane mirror, the entire spectral range from low UV to far IR can be phase-modulated. Chromatic aberrations (with the exception of absorption effects) are ruled out. This results in new processes for chromatic correction in image generation. For this purpose, the illumination is adjusted sequentially to different wavelengths, wherein the wavefront modulator is adjusted to the suitable optical correction for each of the individual wavelengths. In this way, a set of images with optimum chromatic correction is obtained which, when superposed, give a white-light recording of high chromatic correction which cannot be achieved in the same way through the use of conventional glass optics. Accordingly, in principle, an objective with a wavefront modulator can be corrected in an optimum manner on as many wavelengths as desired in the optical spectrum.

The required wavefronts initially have only a rotationally symmetric character for displacement of the focus and for correction of spherical aberrations. In order to generate such wavefronts in the pupil of the microscope objective, the adaptive optics must have a distribution of actuators with increasing spatial frequency toward the edge (FIGS. 4A-4D) because the largest gradient in the wavefront occurs at the edge. FIGS. 4A-4D shows various actuator structures with increasing spatial frequency in FIGS. 4A-4C) and with segments in FIG. 4D, e.g., for correcting astigmatism and coma.

In camera-assisted image generation, the effect of pixel mismatching occurs especially with high spatial resolution. In this case, the microscope image is displaced toward the camera so that the individual images of the video signal are spatially displaced. This problem can be eliminated by a variable tilt component in the wavefront of the imaging signal. The unsteady movements of the image signal can be eliminated by regulation and a static image can accordingly be generated by suitable regulation.

Another problem in camera-assisted image recording is field curvature. The field curvature can be improved during operation, at the expense of other parameters such as chromatic correction, through the use of a wavefront modulator in the imaging beam path.

Figure 3:
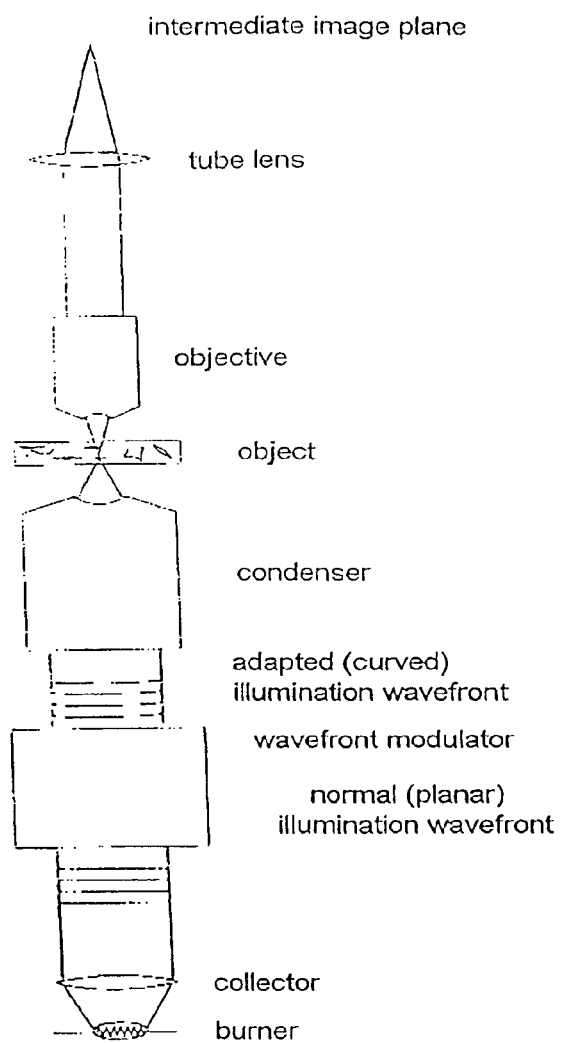
FIG. 3 shows a wavefront modulator between the collector and condenser which are arranged following an illumination burner.

Illumination beam path:

A flexible configuration of optics, improved optical characteristics of the microscope, and new illumination techniques can be realized in the illumination beam path by introducing adaptive optics. In a similar way to the observation beam path, a wavefront phase modulator can optimize the imaging of the illumination burner (or of the laser, as the case may be) in the object plane. Likewise, in the case of critical illumination, an even illumination of the object space can be adjusted. FIG. 3 shows a wavefront modulator between the collector and condenser which are arranged following an illumination burner.

The illumination intensity in the object plane can be optimized spatially with respect to intensity and homogeneity by a wavefront amplitude modulator. In principle, a manipulation of the pupil is possible in this way. An oblique illumination of the object space can be achieved by specifically changing the tilt component or tilt proportion of the wavefront.

Applications in Confocal Microscopy and LSM

By using laser light for illumination, the applications can be realized in confocal microscopy more readily than in conventional light microscopy.

Illumination

When using a laser for illumination, the use of a wavefront modulator is advantageous already when coupling into the illumination fiber. In this respect, it is possible to realize variable adaptation optics whose focal lengths and imaging scale ratio are adjustable in dependence on the beam characteristics of the laser(s) and the utilized fiber(s) in order to achieve an optimum in-coupling into the fiber. Arrangements based on the same principle can also be used in coupling illumination fibers to the microscope optics. Because of the rapidity of the modulators, time-resolved measurements and multiplexing procedures can also be realized in order to switch between one or more lasers and different fibers.

In confocal imaging, the transmission can be adapted dynamically through the defining pinhole. Both the position and diameter of the focus are variable within wide limits. The illumination laser, or lasers, can thus be adjusted in an optimum manner based on requirements. Not only rotationally symmetric apertures but also those having other kinds of outlines or profiles such as lozenge-shaped or rectangular apertures of the type always occurring in pinholes realized in practice can accordingly be adapted and optimized to maximum transmission or minimum diffraction losses. An optimization of this kind can be initiated statically by parameters that are calculated beforehand on the one hand or can be regulated during operation to determined optimizing parameters.

As in conventional light microscopy, the chromatic correction can also be adjusted in dependence on the utilized illumination laser. Sequential images can be recorded at different wavelengths, with optimum chromatic correction in each instance, through the use of fast, synchronously controlled wavefront modulators in the laser input coupling and in the illumination optics and recording optics.

Realization

Wavefront modulators are currently obtainable in different constructions (FIGS. 5A-5D), for example, transmitting modulators based on LCD FIGS. 5A-5D) or reflecting modulators with movable membranes. These may be distinguished, in turn, according to their type of actuating elements: piezo-controlled (5B), electrostatic (5A) or bimorphic membranes (5C). Although the invention is directed generally to wavefront modulators, the electrostatic membrane mirror is especially emphasized in this respect in view of its numerous advantages.

A micro-fabricated monolithic membrane mirror of the type mentioned above, shown in more detail in FIGS. 6A, and 6B with membrane M and driving electrodes E, is distinguished by excellent flatness and good optical quality of the reflecting surface (better than $\lambda/20$), small physical size (2-20 mm), hysteresis-free control with low voltages (less than 100V), high mechanical cutoff frequency of the membrane (several Mhz), large travel or lift (~100 μm), and therefore small radius of curvature (down to 1 m), and an actuator structure that is variable within wide limits and has a high spatial density. The minimum actuator size is ultimately only limited by the condition that it must be greater than the distance between the electrode and the membrane.

The great advantage of the electrostatic membrane mirror consists in the fact that only a constant potential need be applied to the actuator electrode for adjusting a parabolic shape. The parabolic shape of the mirror is given at constant driving of the electrodes by the physical behavior of the membrane (constant surface force). Accordingly, high dynamics can be achieved in the correcting variable (mirror lift) with low dynamics in the control variable, that is, the applied voltage.

Figure 7:
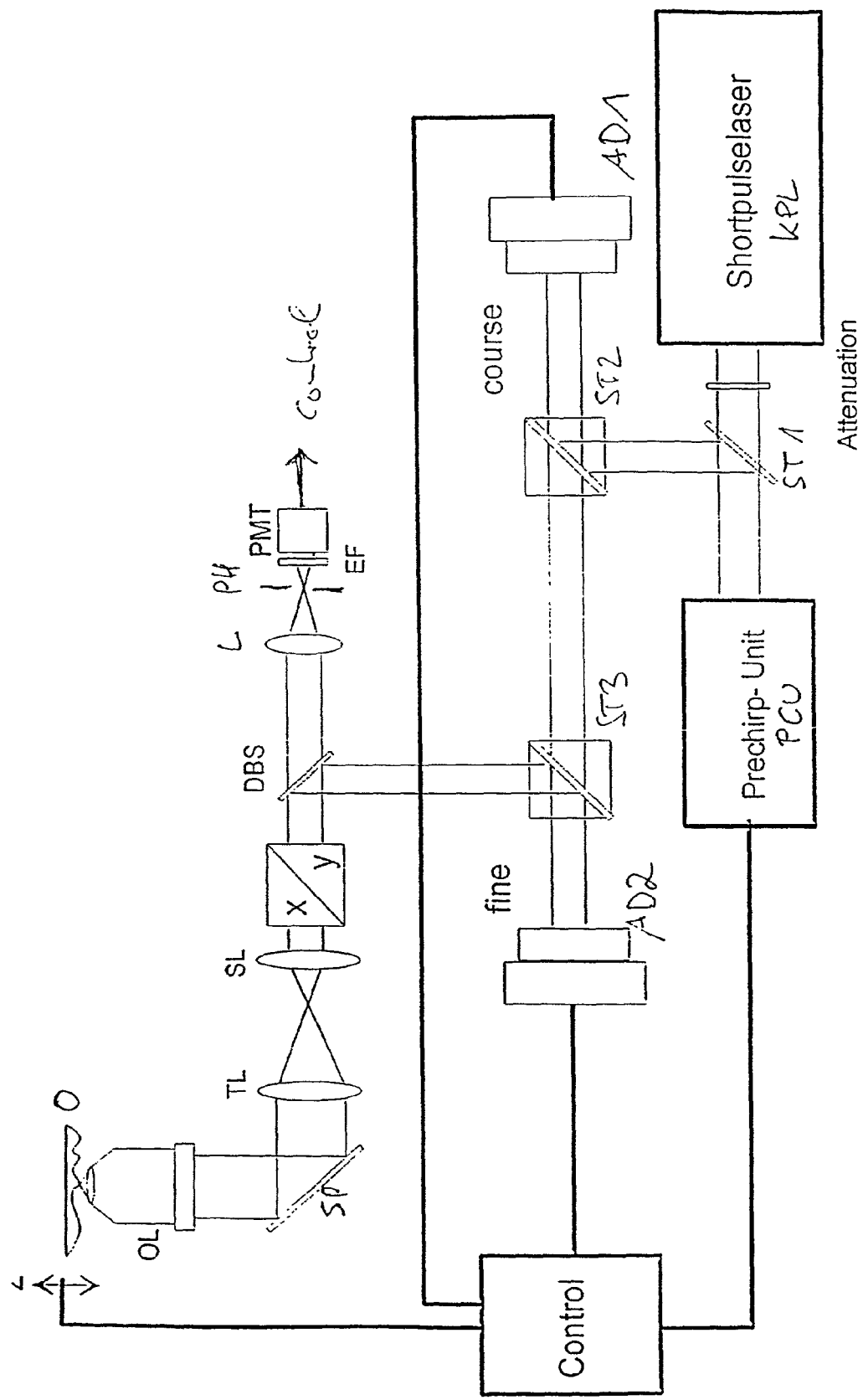
FIG. 7 shows a laser scanning microscope with a short-pulse laser, used especially for multiphoton excitation.

FIG. 7 shows a laser scanning microscope with a short-pulse laser, especially for multiphoton excitation. This will be explained more fully hereinafter.

Nonlinear Processes:

In nonlinear processes, the detected signal depends on the nth power of the excitation intensity. High intensities are necessary for excitation. These high intensities are achieved through the use of short pulse lasers and the subsequent diffraction-limited focussing with microscope objectives. Therefore, it is the aim of the arrangement to realize the smallest possible (i.e., most ideal) focus and the shortest possible pulse length in the specimen. In this way, high intensities can be achieved in the specimen. Nonlinear processes are, for example, multiphoton absorption, surface second harmonic generation (SSHG), and second harmonic generation (SHG), time-resolved microscopy, OBIC, LIVA, etc. The invention will be explained more fully in the following with reference to two-photon microscopy.

WO 91/07651 discloses a two-photon laser scanning microscope with excitation through laser pulses in the subpicosecond range at excitation wavelengths in the red or infrared region.

EP 666473A1, WO 95/30166, DE 4414940 A1 describe excitations in the picosecond range, and beyond, with pulsed or continuous radiation.

A process for optical excitation of a specimen by means of two-photon excitation is described in DE C2 4331570.

DE 29609850 by the present Applicant describes coupling of the radiation of short-pulse lasers into a microscope beam path via light-conducting fibers.

Two-photon Microscopy:

As is well known, two-photon fluorescence microscopy basically opens up the following possibilities in contrast to conventional single-photon fluorescence microscopy:
1. Realization of a nonlinear excitation probability $I_2$ $_{hv}=A\cdot I_{exc}^2$ with the following advantages:
   three-dimensional discrimination, i.e., depth discrimination, without the use of a confocal aperture
   bleaching out and destruction of cells takes place—if at all—only in the focus
   improved signal-to-noise ratio
   use of new detection methods such as non-descanned detection.
2. NIR excitation with femtosecond lasers has the following advantages for the examination of biological specimens:
   working in the region of the optical window for biological preparations (700-1400 nm) due to low absorption; this method is therefore also suitable for the examination of living preparations
   low loading of cells due to low mean excitation output
   high penetration depths due to low scatter.
3. The excitation of so-called UV dyes without the use of UV light means that no UV optics are necessary.
4. In two-photon excitation, there are broad-band excitation spectra of the dyes. Therefore, it is possible to excite very different dyes with only one excitation wavelength.

When ultrashort pulses pass through a dispersing medium, e.g., glass or a preparation, the following effects take place in particular:
1. Group Velocity Dispersion (GVD)

Femtosecond laser pulses have a spectral width of several nanometers. The red-shifted wavelength components propagate more swiftly through a positive-dispersive medium (e.g., glass) that the blue-shifted wavelength components. There is accordingly a temporal widening of the pulses and thus a reduction in peak output or in the fluorescence signal.

A pre-chirping unit (pairs of prisms, gratings or a combination of the two) is a negative-dispersive medium, that is, blue-shifted wavelength components propagate faster than red-shifted wavelength components. The group velocity dispersion can accordingly be compensated by means of a pre-chirping unit.
2. Propagation Time Difference (PTD)

The glass paths differ over the beam cross section, see FIGS. 4A -4D. This causes a spatial enlargement of the focus so that there is a reduction in the resolving capability and peak output or fluorescence signal.

This effect can be compensated by means of a wavefront modulator (adaptive mirror). With a modulator of this kind, the phase and amplitude of the light wave in the excitation beam path can be influenced in a directed manner. A reflecting optical element (e.g., a deformable mirror) or a transmitting optical element (e.g., a LCD) are possible modulators.
3. Wavefront distortion through scattering and diffraction/refraction This distortion can be caused by the utilized optics themselves or by the specimen or preparation. As in the second effect, the wavefront distortion likewise results in deviations from the ideal focus. This effect can also be compensated by a wavefront modulator (see 2).

The effects mentioned above are generally dependent on the depth of penetration into the preparation.

The object of the arrangement is to compensate for the GVD, PTD and wavefront distortion synchronously as a function of the depth of penetration into the preparation in order to achieve short pulse lengths and the most ideal possible small focus in the preparation even with extensive penetration depth.

A possible construction of the arrangement is shown in FIG. 7. The radiation of a short pulse laser KPL passes into a pre-chirping unit PCU and then travels, via beam splitter ST1 and beam splitters ST2, ST3, to two adaptive component elements AD1, AD2. The first component AD1 (coarse) is used for coarse adjustment of the wavefront. It is accordingly possible to shift the focus in the z-direction. The wavefront distortions and the PTD effects are compensated by the second component AD2 (fine). The laser light reaches the object via beam splitter DBS, x/y-scanning unit, optics SL, TL, and mirror SP and objective OL. The light coming from the object travels back via beam splitter DBS, lens L, pinhole PH and filter EF to a detector, in this case a PMT, which is connected in turn with a control unit as are the PCU, AD1 and AD2.

The adjustment of the adaptive elements AD1, AD2 and the pre-chirping unit, for example, can be effected in this way until a maximum signal is present at the detector PMT. The beam path shown in the drawing is particularly advantageous for an inverse microscope in which observation takes place from below in that the specimen remains fully accessible for possible manipulation.

FIGS. 6A-6B show the basic construction of an adaptive mirror. It comprises a highly reflecting membrane (e.g., silicon nitrate) and a structure with electrodes. By specifically controlling the individual electrodes, the membrane situated above the latter can be deformed and the phase front of the laser beam can be influenced. The deformations of the phase front which occur when the pulses pass through the system and through the specimen can accordingly be compensated.

Figure 8A:
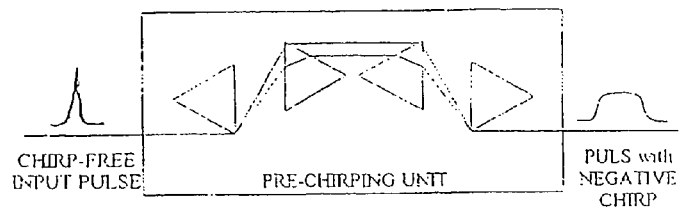
FIGS. 8A-8C show various pre-chirping units.
Figure 8B:
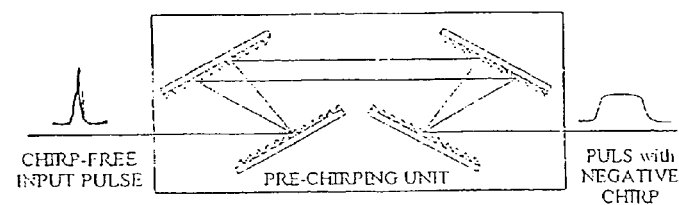
Figure 8C:
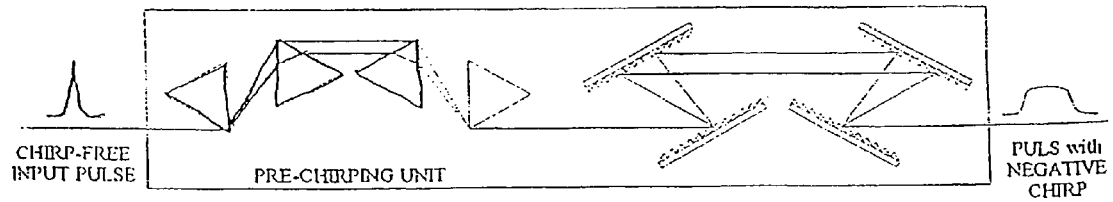

The pre-chirping unit can comprise one or more prisms or gratings or a combination thereof. FIGS. 8A-8C show possible arrangements with prisms (FIG. 8A), gratings (FIG. 8B), and with prisms and gratings (FIG. 8C). The manner of operation is seen more fully in 8A with reference to a prism compressor. The spectral width of a femtosecond laser pulse is several nanometers. When the laser beam passes through the first prism, the beam is broken up into its spectral components. Subsequently, the spectral components travel different glass paths in the second prism. Red-shifted wavelength components are accordingly retarded in relation to the blue-shifted components. The pre-chirping unit accordingly acts as a negative-dispersive medium and a compensation of GVD is also possible.

For the first time, through the use of the arrangement described above, the advantages of the excitation of nonlinear processes can be utilized to their full extent and the use of low-power femtosecond lasers is made possible even at greater depths of penetration into the specimen.

High peak outputs can accordingly be realized with the use of low mean excitation outputs so that loading of the biological preparations or specimens can be kept low, and a high signal-to-noise ratio and high resolution can be achieved in the axial and lateral directions.

In all of the arrangements described above, the wavefront adaptation can be advantageously detected and monitored, and adjusted in a defined manner, by means of a wavefront sensor which communicates with the microscope beam path via a beam splitter (not shown).

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. A laser scanning microscope arrangement, comprising:
   a laser scanning microscope having a short pulse laser which illuminates a focused point that is scanned across an object; and
   at least one controllable wavefront modulator with adaptive optics for deliberately influencing phase or amplitude of a light wave to change the wavefront of the light wave and located following the laser;
   wherein the modulator is located in the pupil plane of the beam path.

2. The laser scanning microscope arrangement of claim 1; wherein said at least one controllable wavefront modulator includes first and second wavefront modulators for coarse and fine adjustments, respectively.

3. The laser scanning microscope arrangement of claim 1; wherein said at least one controllable wavefront modulator is a reflecting wavefront modulator.

4. The laser scanning microscope arrangement of claim 1, further comprising:
   a pre-chirping unit.

5. The laser scanning microscope arrangement of claim 1, further comprising:
   a pre-chirping unit displaced within a beam path of said laser scanning microscope;
   wherein said at least one controllable wavefront modulator is within the beam path of said laser scanning microscope; and said laser is a short pulse laser adapted to produce multiphoton excitation in a sample.

6. The laser scanning microscope arrangement of claim 1; wherein said microscope is a confocal microscope.

7. The laser scanning microscope arrangement of claim 1; wherein the wavefront modulator is used for correction of aberrations caused by a microtiter plate.

8. The laser scanning microscope arrangement of claim 1, for investigation of samples in the biomedical area.

9. The laser scanning microscope arrangement of claim 1; wherein said wavefront modulator is adapted to correct distorted wavefronts caused by an objective.

10. The laser scanning microscope arrangement of claim 9; wherein the wavefront modulator corrects distorted wavefronts in the pupil plane of the beam path.

11. The laser scanning microscope arrangement of claim 1; wherein static water immersed objects are viewable as a sectionwise image.

12. A laser scanning microscope arrangement, comprising:
   a laser scanning microscope having a short pulse laser which illuminates a focused point that is scanned across an object; and
   at least one controllable wavefront modulator with adaptive optics for influencing phase or amplitude of a light wave to change the wavefront of the light wave, the controllable wavefront modulator being arranged in an excitation beam path and arranged to receive light from the short pulse laser;
   wherein the modulator is located in the pupil plane of the beam path.

* * * * *